(12) United States Patent
Harvey et al.

(10) Patent No.: US 6,606,852 B1
(45) Date of Patent: Aug. 19, 2003

(54) ROCKET MOTOR INSULATION CONTAINING HYDROPHOBIC PARTICLES

(75) Inventors: Albert R. Harvey, Brigham City, UT (US); John W. Ellertson, Brigham City, UT (US)

(73) Assignee: Alliant Techsystems Inc., Edina, MN (US)

( * ) Notice: Subject to any disclaimer, the term of this patent is extended or adjusted under 35 U.S.C. 154(b) by 0 days.

(21) Appl. No.: 09/613,837

(22) Filed: Jul. 11, 2000

Related U.S. Application Data

(60) Provisional application No. 60/142,960, filed on Jul. 12, 1999.

(51) Int. Cl.$^7$ .............................. F02K 9/34; F02K 9/00; C08L 23/16; C08L 23/26; C08F 232/06
(52) U.S. Cl. .................... 60/255; 60/253; 523/138; 524/492; 525/331.7; 525/360; 528/490
(58) Field of Search ................ 523/138; 524/492; 525/331.7, 360; 60/253, 255; 528/490

(56) References Cited

U.S. PATENT DOCUMENTS

| | | | |
|---|---|---|---|
| 2,870,108 A | 1/1959 | Nickerson | ............... 260/29.1 |
| 2,964,457 A | 12/1960 | Kraus | ............... 204/154 |
| 3,723,481 A | 3/1973 | Bobear | ............... 260/37 SB |
| 3,928,282 A | 12/1975 | Lohr, Jr. et al. | ............... 260/4.244 |
| 4,072,796 A | 2/1978 | Reinhardt et al. | ............... 428/405 |
| 4,297,145 A | 10/1981 | Wolff et al. | ............... 106/308 |
| 4,524,169 A | 6/1985 | Wolff et al. | ............... 524/263 |
| 4,663,065 A | 5/1987 | Herring | |
| 4,785,047 A | 11/1988 | Jensen | ............... 524/714 |
| 4,878,431 A | * 11/1989 | Herring | |
| 5,216,057 A | 6/1993 | Pratt et al. | ............... 524/269 |
| 5,498,649 A | 3/1996 | Guillot | ............... 524/100 |
| 5,565,535 A | 10/1996 | Costin et al. | ............... 526/240 |
| 5,661,198 A | 8/1997 | Inatani et al. | ............... 523/179 |
| 5,721,301 A | 2/1998 | Takigawa | ............... 524/267 |
| 5,767,221 A | 6/1998 | Poulter et al. | ............... 528/51 |
| 5,780,538 A | 7/1998 | Cohen et al. | ............... 524/494 |

FOREIGN PATENT DOCUMENTS

EP  0 116 453  * 8/1984

OTHER PUBLICATIONS

Product literature on TULCO treated Silica products (Jun. 1999), pp. 2.
Product literature for Saret 633 and Saret 634 Metallic Coagents.
Product literature—"Treated Fumed Silicas Product Guide" for Cabot products CAB–O–SIL treated silica (Jun. 1999).

* cited by examiner

Primary Examiner—Tae H. Yoon
(74) Attorney, Agent, or Firm—TraskBritt

(57) ABSTRACT

A rocket motor insulation including an elastomer base polymer is improved in its processability by the addition of silica particles treated with a hydrophobic coating. The insulation also preferably includes a metallic coagent crosslinker, which when used in combination with the hydrophobic silica particles increases the tear strength and the elasticity of the insulation, while at the same time not adversely affecting the bonding characteristics of the insulation.

20 Claims, 3 Drawing Sheets

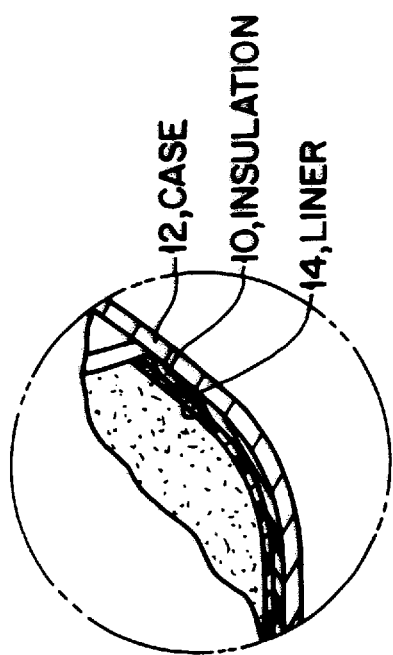
*FIG. IB*
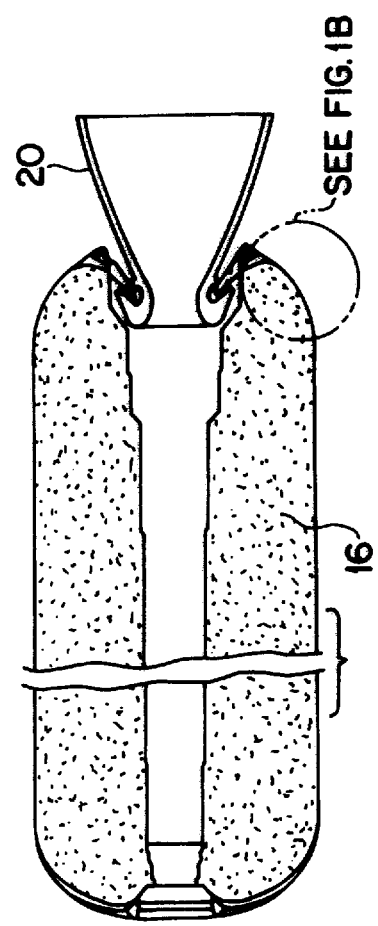
*FIG. IA*

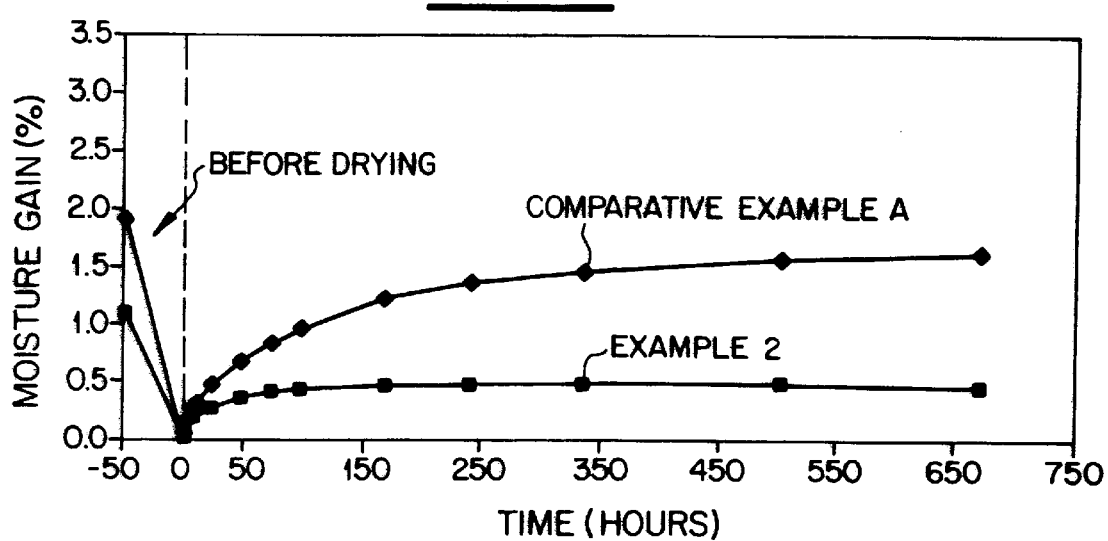
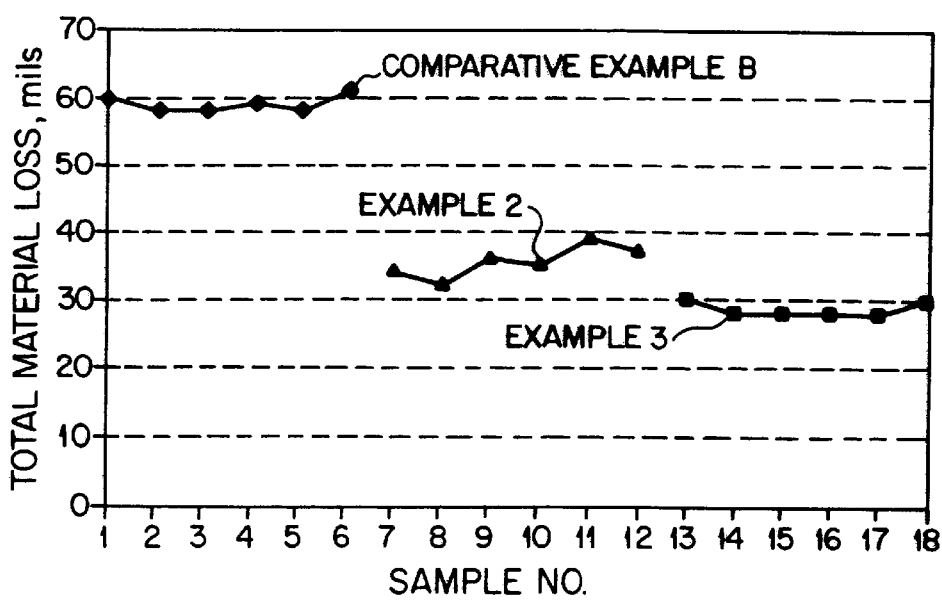

ROCKET MOTOR INSULATION CONTAINING HYDROPHOBIC PARTICLES

RELATED APPLICATIONS

The benefit of priority is claimed of provisional application 60/142,960 filed in the U.S. Patent & Trademark Office on Jul. 12, 1999, the complete disclosure of which is incorporated herein by reference.

BACKGROUND OF THE INVENTION

1. Field of the Invention

This invention is directed to elastomer-based insulation for rocket motors, such as the type interposed between a solid propellant grain and a rocket motor casing to protect the casing from high temperatures experienced during burning of the solid propellant grain. In particular, this invention is directed to a solid rocket motor insulation composition that is relatively insensitive to process variables such as moisture contamination and relative humidity, yet upon curing exhibits excellent physical properties and thermal and ablative performances.

2. Description of the Related Art

Solid rocket motors typically include an outer casing or case housing a solid propellant grain. The rocket motor casing is conventionally manufactured from a rigid, yet durable, material such as steel or filament-wound composite. The propellant is housed within the casing and is formulated from a composition designed to undergo combustion while producing the requisite thrust for attaining rocket motor propulsion.

During operation, a heat insulating layer or layers (insulation) protects the rocket motor casing from heat and erosion caused by particle streams generated by combustion of the propellant. Typically, the insulation is bonded to the inner surface of the casing and is generally fabricated from a composition that, upon curing, is capable of withstanding the high temperature gases and erosive particles produced while the propellant grain burns. A liner layer (liner) functions to bond the propellant grain to the insulating layer and to any non-insulated portions of the casing. Liners also have an ablative function, inhibiting burning of the insulation at liner-to-insulation interfaces. Liner compositions are generally known to those skilled in the art. An exemplary liner composition and process for applying the same is disclosed in U.S. Pat. No. 5,767,221, the disclosure of which is incorporated herein by reference.

The combustion of solid rocket propellant generates extreme conditions within the rocket motor casing. For example, temperatures inside the rocket motor casing typically reach 2,760° C. (5,000° F.). These factors combine to create a high degree of turbulence within the rocket motor casing. In addition, the gases produced during propellant combustion typically contain high-energy particles that, under a turbulent environment such as encountered in a rocket motor, can erode the rocket motor insulation. If the propellant penetrates through the insulation and liner, the casing may melt, causing the rocket motor to fail. Thus, it is crucial that insulation withstands the extreme conditions experienced during propellant combustion and protects the casing from the burning propellant. Unless the insulation is capable of withstanding such conditions, failure may occur.

Further, once formulated but prior to full curing, the insulation composition must also possess acceptable shelf life characteristics such that the insulation composition remains sufficiently pliable until used in application to the rocket motor casing. This requirement is essential because the production of a given lot of insulation may have to wait in storage for a number of months prior to cure and installation. Similarly, after application to a rocket motor casing and subsequent curing, a functionally acceptable solid propellant rocket motor insulation must survive aging tests. Rocket motors may be fully fabricated many months before actual firing; in the case of tactical weapons especially, rocket motors may be fabricated as much as a year before actual firing. Over that period of time, the insulation composition must continue to remain fully functional without unacceptable migration of its components to or from adjacent interfacial surfaces and adequately retain its elastomeric characteristics to prevent brittleness. These requirements need to be satisfied under extremely wide temperature variations.

After application of the insulation to the interior of the rocket motor casing, and subsequent to curing thereof, an acceptable cured insulation must also exhibit satisfactory bonding characteristics to a variety of adjacent surfaces. Such surfaces include the internal surface of the rocket motor casing itself. The insulation must also exhibit adequate bonding characteristics with the propellant grain, or with a liner surface interposed between the insulation and propellant grain.

Further, cured insulation must meet the ablation limits for protection of the rocket motor casing throughout the propellant burn without adding undue weight to the motor.

In the past, candidates for making rocket motor insulation have included filled and unfilled rubbers and plastics such as phenolic resins, epoxy resins, high temperature melamine-formaldehyde coatings, ceramics, polyester resins, and the like. The latter plastics, however, crack and/or blister as a result of the rapid temperature and pressure fluctuations experienced during combustion.

Elastomeric candidates have also been investigated and used. The elastomers are used in a large number of rocket motors because their thermal and ablative properties are particularly suited for rocket motor applications. However, the mechanical properties of elastomers, such as elongation capabilities and tensile strength, are often inadequate for rocket motor operation and processing. For example, cured elastomeric insulation, whether thermosetting or thermoplastic, often becomes brittle and cracks in operation unless reinforced with suitable fillers. The cracking of the cured elastomeric insulation creates paths through the insulation which expose the casing to the combustion reaction, thereby rendering the casing more susceptible to failure.

In order to improve the mechanical properties of elastomeric insulation, it has been proposed to reinforce the elastomeric insulation with precipitated silica or silicate. The presence of precipitated silica or silicate in elastomeric rocket motor insulation advantageously improves the mechanical properties of the elastomer matrix, and further has the secondary benefit of improving the thermal and ablative performance of the insulation. The use of precipitated silica is reported, by way of example, in U.S. Pat. No. 5,498,649 to Guillot. However, because silica and silicate particles are hydrophilic, insulation compositions containing precipitated silica and/or silicate are provided to absorb significant amounts of moisture when exposed to humid environments. High moisture content in a rocket motor insulation can adversely affect bonding characteristics of the insulation, especially at moisture sensitive interfaces, such as the insulation-to-casing bond interface and the insulation-to-liner bond interface. The later bond interface is particularly sensitive to moisture because of the isocyanates typically used in liner formulations.

To address these problems, dry cycles have been implemented to control the moisture content during the manufacture of the insulation and while insulating the rocket motor case. However, the practice of these requisite dry cycles complicates and prolongs processing. Thus, where hydrophilic silica and/or silicate particles are used in insulation compositions, very rigorous process controls commonly are imposed to account for process variables such as moisture contamination and relative humidity.

SUMMARY OF THE INVENTION

It is, therefore, an object of this invention to provide a rocket motor insulation composition that is relatively insensitive to process variables such as moisture contamination and relative humidity, yet upon laying-up into a rocket motor casing and subsequent curing exhibits and maintains excellent low temperature and high temperature physical properties and thermal and ablative performances.

In accordance with the principles of this invention, the above and other objects are attained by a rocket motor composition comprising, prior to curing into an elastomeric composition, at least one organic polymer, at least one curative, optionally at least one curing co-agent, and hydrophilic particles coated with at least one hydrophobization agent. Preferably, the curative comprises one or more peroxides.

By using filler particles that have been treated with a suitable hydrophobization agent, the rocket motor composition exhibits reduced sensitivity to process variables such as moisture contamination and relative humidity. Additionally, after peroxide curing in the presence of the coagent, the elastomeric rocket motor insulator possesses excellent insulating properties. To the surprise of the inventors, however, the elastomeric rocket motor insulator also exhibits improved mechanical properties (e.g., elongation capability and tensile strength) over conventional peroxide-cured polymers containing hydrophilic silica particles. This finding of improved mechanical properties was surprising and unexpected because hydrophobic silica particles evaluated by the inventors generally were believed to contribute less reinforcing characteristics to an elastomeric insulation than conventional hydrophilic silica fillers. Although this invention is not intended to be limited to any theory, the improvement in reinforcing characteristics contributed by the hydrophobized silica particles is believed to be the result of a synergistic effect realized by using the hydrophobized particles in combination with a peroxide curing agent and the coagent described herein.

Other objects, aspects and advantages of the invention will be apparent to those skilled in the art upon reading the specification and appended claims which, when read in conjunction with the accompanying drawings, elucidate the principles of this invention.

BRIEF DESCRIPTION OF THE DRAWINGS

The accompanying drawings serve to elucidate the principles of this invention. In such drawings:

FIGS. 1A and 1B are schematic cross-sectional views of an embodiment of a rocket motor assembly in which the insulation of this invention is provided;

FIG. 2 is a graph showing the reduced moisture sensitivity of an example of the inventive insulation with reference to a comparative example;

FIG. 4 is a graph showing the reduced material loss in a thermal flash test of an example of the inventive insulation compared to another comparative example.

DETAILED DESCRIPTION OF THE INVENTION

Figure 3:
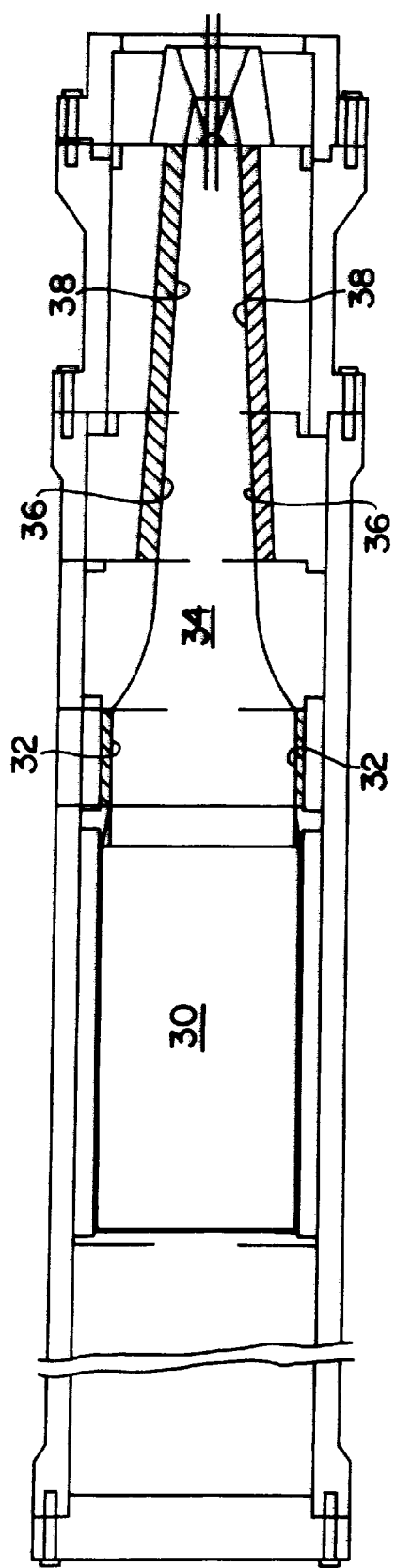
FIG. 3 is a schematic cross-sectional view of a test char motor.

The present invention comprises rocket motor insulation, and a composition curable into the rocket motor insulation. The insulation composition is commonly applied as a layer or layers into a rocket motor casing 12, then is cured to form the insulation, which is generally designated in FIGS. 1A and 1B by reference numeral 10. Cast inside of the insulation 10 is a solid propellant 16, which is illustrated in FIG. 1A as a center perforation propellant, although the invention is not thereby limited, since the inventive insulation may be used with end-burning propellants and other propellant configurations. Typically, a liner 14 is interposed between the insulation 10 and a solid propellant 16, although the liner 14 may directly bond the propellant 16 to the casing 12. The insulation 10 and liner 14 serve to protect the casing 12 from the extreme conditions produced as the propellant 16 is burned. Methods for loading a rocket motor casing 12 with insulation 10, a liner 14, and propellant 16 are known to those skilled in the art, and can be readily adapted within the skill of the art without undue experimentation to incorporate the insulation composition of this invention. Nozzle 18 is operatively associated with the casing 12 to receive combustion products generated by combustion of the propellant 16 and to expel the combustion products, thus generating thrust to propel the rocket.

As mentioned above, the inventive insulation contains, in a cured state, one or more organic elastomeric polymers. As referred to herein, the term "organic elastomeric polymer" means a polymer having a backbone including carbon as a main component and free of metals or metalloids in the backbone. Generally, an elastomeric polymer is stretchable and compressible under moderate tension with a relatively high tensile strength and memory so that, upon release of the tension or compression, the elastomer retracts towards its original dimensions. Organic elastomers suitable for the present invention include ethylene-propylene-diene monomer (EPDM) rubbers, natural rubber, butadiene-styrene copolymer rubbers, nitrile rubbers, polybutadiene rubbers, polyisoprene rubbers, and the like. Various mixtures, combinations, copolymers, and blends of these exemplary rubbers are also included within the scope of the invention.

In the event that EPDM rubber is selected as the organic elastomer, it is advantageous to use an EPDM rubber having a high ethylene content, such as in the range of 50 to 70 percent by weight. EPDM polymers with relatively high ethylene contents are known to enhance the green strength of uncured formulations. High green strength is important for facilitating calendering operations during processing. Exemplary blends of EPDM polymers include combinations of NORDEL® IP NDR-4520 and NORDEL® IP-NDR 4640 brand products, which each have an ethylene content in the range of 50 to 55% by weight. The NORDEL® IP-NDR 3722p brand product, which has an ethylene content of 70 percent by weight, is useful for increasing the ethylene content to further improve green strength.

Preferably, the organic elastomeric polymers comprises from about 35 wt % to about 80 wt %, and still more preferably from about 45 wt % to about 60 wt % of the total weight of the rocket motor insulation.

The peroxide generally functions as a crosslinking agent or promoter, for example, by abstracting the hydrocarbon atom from the elastomer molecule (e.g., the diene of the EPDM) and providing polymeric free radicals for forming cross-links. The peroxide curative preferably comprises from about 0.5 phr to about 8 phr, more preferably about 2 phr to about 5 phr, of the insulation composition. As referred to herein and generally accepted in the art, "phr" means parts by weight per one hundred parts by weight polymer. A representative, but not exhaustive or exclusive, list of suitable peroxide curatives includes dicumyl peroxide, 2,5-dimethyl-2,5-bis-(t-butylperoxy)hexane, 2,5-dimethyl-2,5-bis-(benzoylperoxy)hexane, 2,5-dimethyl-2,5-di(t-butylperoxy)-3-hexane, n-butyl-4,4-bis-(t-butylperoxyl) valerate, 4,4'-methylbis-(cyclohexylamine)carbomate, 1,1-bis-(t-butylperoxy)-3,3,5-trimethylcyclohexane, α,α'-bis-(t-butylperoxy)diisopropylbenzene, 2,5-dimethyl-2,5-bis-(t-butylperoxy)hexane, and di-t-butyl peroxide. Commercially available peroxide curatives are available, for example, under the trade name DI-CUP® 40KE, which comprises about 40% dicumyl peroxide on a clay carrier. (The clay carrier is available from Burgess Pigment Company.)

One or more curative coagents are preferably included to increase the degree and rate of cure. Preferably, the curative coagent is an "ionic curative coagent," also referred to as a "metallic curative coagent," which is meant to encompass a metal salt which is capable of forming an organometallic crosslink bond having an ionic portion. Coagents include metal salts of ethylenically unsaturated carboxylic acids, especially the metal salts of acrylic and methacrylic acids. A representative, but not exhaustive or exclusive, list of ionic curative coagents include metallic acrylates and methacrylates, such as zinc diacrylate and zinc dimethacrylate, which are available from Sartomer Company as SARET® 633 and SARET® 634, respectively. The use of zinc diacrylate and zinc dimethacrylate as coagents in a much different environment is described in U.S. Pat. No. 5,565,535, which is incorporated herein by reference. Generally, the ionic curative coagent is present in an effective amount to increase the degree of rate of cure, and representative amounts are greater than 0 phr to 40 phr, more preferably 10 phr to 20 phr. Polyfunctional unsaturated organic compounds may also be selected as the curative coagent. Suitable polyfunctional unsaturated organic compounds include, by way of example, the following: methacrylates such as trimethylolpropane trimethacrylate, pentaerythritol trimethacrylate, pentaerythritol tetramethacrylate; acrylates such as pentaerythritol triacrylate and trimethylolpropane triacrylate; imides such as N,N'-m-phenylene-dimaleimide; triallyl cyanurates; triallyl isocyanurates; and diallyl phthalates.

Representative hydrophobization (or hydrophobic) agents include, by way of example, the following: organohalosilanes, such as dimethyldichlorosilane, methyltrichlorosilane, dimethyldibromosilane, methyltribromosilane, diethyldichlorosilane, ethyltrichlorosilane, diproplydichlorosilane, diisopropyldichlorosilane, propyltrichlorosilane, dibutyldichlorosilane, and butyltrichlorosilane; disilazanes, such as hexamethyl-disilazane; organosilanes, such as trimethoxy-octyl-silane, hexadecyl silane, methyacryl-silane; siloxanes such as octamethyl-cyclo-tetra-siloxane, and polydimethylsiloxane; compounds with one or more alkylsiloxyl moieties, such as trimethylsiloxyl moieties; or combinations thereof.

Methods of making various hydrophobization agents are disclosed in U.S. Pat. No. 4,072,796, the complete disclosure of which is incorporated herein by reference. Hydrophobized silica is also commercially available. For example, silica particles treated with dimethyldichlorosilane are available from Degussa as AEROSIL® R972 and AEROSIL® R974, and are also available from Cabot Corporation as CAB-O-SIL® TS-610. Silica particles treated with hexamethyl-disilazane are available from Degussa as AEROSIL® R812, AEROSIL® R812S, AEROSIL® R71 1, and AEROSIL® R8200, and also are available from Cabot Corporation as CAB-O-SIL® TS-500, CAB-O-SIL® TS-530, and CAB-O-SIL® TG-810G. AEROSIL® R8200 has a relatively high bulk density, making it useful for lowering the overall bulkiness of the formulation. Silica particles treated with trimethoxy-octyl-silane are available from Degussa as AEROSIL® R805. Silica particles treated with hexadecyl silane, methyacryl-silane, and octamethyl-cyclo-tetra-siloxane are each available from Degussa as AEROSIL'R816, AEROSIL® R711, and AEROSIL® R104, respectively. Silica particles treated with polydimethylsiloxane are available from Cabot Corporation as CAB-O-SIL® TG-308F and CAB-O-SIL® TG-720. Silica treated with compounds having trimethylsiloxyl moieties is available from Tulco Inc. as TULLANOX 500. Additionally, silica particles treated with a combination of these and other hydrophobic agents include, by way of example, AEROSIL® R 504, which has a combination of triethoxy-propyl-amino-silane and hexamethyl-disilazane as the surface treatment agents.

As referred to herein, silica particles include, but are not limited to, spherical particles. The silica particles can have grain-like or other non-spherical shapes, and may be formed in small agglomerations. Preferably, the treated silica particles have an average surface area of 130 $m^2$/grams to 300 $m^2$/grams and are coated with the hydrophobic agents. Preferably, the treated silica particles have an average particle size in the range of 10 nm to 15 nm.

Representative concentrations of the hydrophobized silica particles in the insulation composition range, for example, from about 35 phr to about 70 phr. Generally, higher loads of hydrophobic silica particles can be used than hydrophilic silica, since hydrophilic silica particles will impart a greater increase to the viscosity of the insulation composition than an equal amount of hydrophobic silica particles.

The hydrophobized particles can be used alone or in combination with other materials affecting the ablative and mechanical properties of the insulation. By way of example, suitable materials include polybenzoxazole fibers, iron oxide, milled glass, carbon, ceramic clay, and the like.

The composition may also optionally include antioxidants to improve the longevity of the cured elastomer. Examples of suitable antioxidants are diphenylamine reacted with acetone, available as BLE®-25 Liquid from Uniroyal Chemical; a mixture of mono-, di-, and tri-styrenated phenols, available as AGERITE® SPAR from B.F. Goodrich Chemical Co. Other suitable antioxidants include polymerized 1,2-dihydro-2,2,4-trimethylquinoline (AGERITE® RESIN D) and mixed octylated diphenylamines (AGERITE® STALITE S), each of which is available from R.T. Vanderbilt Co.

Other optional ingredients include fillers that function as flame retardants. Flame retardants, or phosphate char forming additives, can be used in lesser amounts than most other additives, which makes it easier to formulate the insulation to possess, upon curing, good mechanical properties. Both inorganic and organic flame retardants are expected to be useful in the present invention. An example of an organic flame retardant is chlorinated hydrocarbon, available as DECHLORANE®, in combination with antimony oxide or hydrated alumina. Examples of inorganic flame retardants are phosphate and phosphate derivatives, available as PHOSCHEK P/30® produced by Solutia, Inc.

An exemplary plasticizer for the inventive composition is TRILENE® 67A, which is a liquid EPDM elastomer available from Uniroyal.

Tackifiers may also optionally be used. Examples of suitable tackifiers are WINGTACK® 95 made by Goodyear Tire & Rubber Company and AKROCHEM® P-133 made by Akron Chemical Company.

Suitable cure activators include metal oxides, such as zinc oxide and magnesium oxide (ELASTOMAG® 170, from Morton Chemical Co.), and stearic acid (including palmitic acid), which is available from Harwick Standard Distribution Corp. of Akron, Ohio.

It is also highly desirable to incorporate processing aids into the formulation in order to address the high stickiness of the compositions. An exemplary processing aid is STRUKTOL® HPS 11, which is a blend of fatty acid derivatives, and STRUKTOL® WB 16, which is a mixture of fatty acid soaps. Both processing aids are available from Struktol Company. A suitable concentration for the processing aids is about 2 phr.

Other ingredients well known in the art and/or suitable for use in rocket motor thermal insulation applications are intended to be included within the scope of the present invention.

EXAMPLES

The following examples illustrate embodiments that have been made in accordance with the present invention, as well as comparative examples prepared for comparison purposes. The inventive embodiments are not exhaustive or exclusive, but merely representative of the many types of embodiments which may be prepared according to this invention.

The compositions of Examples 1–8 and Comparative Examples A and B are set forth in Tables 1, 3, and 5. Tables 2 and 4 set forth the properties of the compositions subsequent to curing, which was conducted for 1 hour at 150° C. (320° F.). Unless otherwise indicated, all parts are in phr.

Example 1

A Brabender mixer having a net chamber volume of 350 cubic centimeters was used for conducting a two-pass mix. The batch size was 300 grams. All of the ingredients except for the peroxide were added in the first mix cycle, and mixing was performed at 30 rpm with a dust collection system turned off. In the second mix cycle the dust collection system was turned on, and the peroxide curative was added and mixing was performed at 40 rpm.

Example 2

A laboratory scale Reliable Rubber & Plastics Machinery Company Model R-260 internal mixture having a net chamber volume of 4260 cubic centimeters was used for Example 2. A two-pass mix was used to make the formulation. The batch size was 3000 grams. All of the ingredients except for the peroxide and SARET® 634 were added in the first mix cycle with the dust collection system turned off, and mixed at 20 rpm mixing speed. After the filler was incorporated, the dust collection system was turned on and the mixer speed increased to 60 rpm to form master batch 1. Master batch 1 was dumped at a temperature between 110° C. (230° F.) and 121.1° C. (250° F.). The peroxide and SARET® 634 were added to master batch 1 in the second mix cycle and mixed at a mixing speed of 40 rpm, then dumped at a temperature between 65.6° C. (150° F.) and 76.7° C. (170° F.). The dust collection system was on during the entire second mix cycle.

Example 3

To the fully compounded materials from Example 2 containing the peroxide and coagent, prior to crosslinking, was added extra TULLANOX® until 70 parts per weight of filler was reached.

Comparative Example A

A Brabender mixer having a net chamber volume of 350 cubic centimeters was used for conducting a two-pass mix. The batch size was 300 grams. All of the ingredients except for the peroxide were added in the first mix cycle, and mixing was performed at 30 rpm with a dust collection system turned off. In the second mix cycle the dust collection system was maintained off, and the peroxide curative was added and mixing was performed at 40 rpm.

TABLE 1

|  | Example 1 | Example 2 | Example 3 | Comparative Example A |
|---|---|---|---|---|
| NORDEL ® 1040 EPDM* | 55 | 55 | 55 | 55 |
| NORDEL ® 2522 EPDM* | 15 | 30 | 30 | 15 |
| TRILENE ® 67A Liquid EPDM | 30 | 15 | 15 | 30 |
| AGERITE ® Resin D | 2 | 2 | 2 | 2 |
| WINGTACK ® 95 | 7 | 7 | 7 | 7 |
| HI-SIL ® 233 | — | — | — | 45 |
| TULLANOX ® 500 | 45 | 45 | 70 | — |
| N-330 Carbon Black | 1 | 1 | 1 | 1 |
| TZFD88-p Zinc Oxide | 5 | 5 | 5 | 5 |
| Stearic Acid | — | 1 | 1 | — |
| SARET ® 634 | — | 10 | 10 | — |
| DI-CUP ® 40KE | 10 | 1910 | 10 | 10 |
| Total | 170 | 181 | 206 | 170 |

*available from DuPont Dow Elastomers of Beaumont, Texas., and contain 1,4-hexadiene (HD) as the diene monomer component.

TABLE 2

|  | Example 1 | Example 2 | Example 3 | Comparative Example A |
|---|---|---|---|---|
| Mooney viscosity (MU at 100° C.; ASTM D1646) | 43.8 | 55.8 | 85.4 | 69.5 |
| Specific Gravity (ASTM D792) | 1.0866 | 1.1030 | 1.1489 | 1.0956 |
| Ash Content (%) | 31.42 | 31.17 | 37.9 | 30.53 |
| Shore A Hardness (ASTM D2240) | 61.2 | 77.4 | 81.8 | 71.0 |
| 100% Modulus (psi) (ASTM D412) | 150 | 459 | 515 | 256 |
| Tensile Strength (psi) (ASTM D412) | 1780 | 2810 | 2610 | 1990 |
| Elongation (%) (ASTM D412) | 724 | 618 | 650 | 671 |

TABLE 2-continued

|  | Example 1 | Example 2 | Example 3 | Comparative Example A |
|---|---|---|---|---|
| Tear Resistance (pli) (ASTM D624) | 130 | 327 | 386 | 195 |

From Table 1, it is understood that Examples 2 and 3 were prepared in accordance with a preferred embodiment insofar as these examples contain hydrophobic silica, peroxide curative and metallic curative coagent. In Example 1.

The composition was free of metallic curative coagent.

As shown in Table 2, Examples 2 and 3 respectively exhibited tensile strengths of 2810 and 2610 psi, which are about 50% greater than the tensile strength of Example 1 and 30–40% greater than the tensile strength of Comparative Example A. Further, Examples 2 and 3 respectively exhibited tear resistances of 327 and 386 pli, which were 2 to 3 times greater than the tear resistance of Example 1 and more than 50% greater than the tear resistance of Comparative Example A. Furthermore, each of Examples 2 and 3 exhibited a respective stiffness, as measured by 100% modulus, of 459 psi and 515 psi. Generally, the insulation of this invention that is highly tolerant to damage will exhibit a 100% modulus of at least 400 psi, more preferably at least 500 psi, and a tear resistance of at least 300 pli, as measured by the above-mentioned ASTM standards.

The reduced moisture sensitivity of insulation prepared in accordance with this invention is demonstrated by FIG. 2. In FIG. 2, the moisture gain of Example 2 (designated by square data points) and Comparative Example A (designated by diamond data points) were measured at 85% relative humidity over a period of more than 650 hours. The results showed that Comparative Example A gained more than 3 times the amount of moisture over a 650-hour period than Example 2.

Also of interest is that the tensile strength and tear resistance of Comparative Example A were higher than found in Example 1. This reinforces the unexpected results obtained by this invention, since from Comparative Example A and Example 1 one of ordinary skill in the art would have expected the replacement of hydrophilic silica (Comparative Example A) with hydrophobic silica (Example 1) to adversely affect physical properties. However, the inventors found that the synergistic effect of improved physical properties and lower moisture sensitivity can be realized by using the hydrophobic silica in combination with a peroxide curative and metallic curative coagent.

The ablative properties of the inventive formulation are illustrated further in connection with Examples 4–8 and Comparative Example B below.

Examples 4 and 8 and Comparative Example B

The two pass mix cycle described above in connection with Example 1 was used to make Examples 4 and 8, except that mixing was performed in a laboratory scale Reliable Rubber & Plastics Machinery Company Model R-260 internal mixture having a net chamber volume of 4260 cubic centimeters. The batch size was 3000 grams.

Examples 5–7

A laboratory scale Reliable Rubber & Plastics Machinery Company Model R-260 internal mixture having a net chamber volume of 4260 cubic centimeters was used for Examples 5–7. Because of the bulkiness of the hydrophobic silica, a three-pass mix was used to make the formulations. The batch size for each phase of the mixing was 3000 grams. All of the ingredients except for the peroxide and half of the hydrophobic particles were added in the first mix cycle with the dust collection system turned off, and mixed at 20 rpm mixing speed. After the filler was incorporated, the dust collection system was turned on and the mixer speed increased to 60 rpm to form master batch 1. Master batch 1 was dumped at a temperature between 110° C. (230° F.) and 121.1° C. (250° F.). Similarly, master batch 2 was mixed by adding the remainder of the hydrophobic filler to master batch 1, with the mixer speed set at 20 rpm and the dust collection system turned off. After the filler was incorporated, the dust collection system was turned back on, and the mixer speed was increased to 60 rpm. Master batch 2 was dumped at a temperature between 110° C. (230° F.) and 121.1° C. (250° F.). The peroxide was added to master batch 2 in the third mix cycle and mixed at a mixing speed of 40 rpm, then dumped at a temperature between 65.6° C. (150° F.) and 76.7° C. (170° F.). The dust collection system was on during the entire third mix cycle.

TABLE 3

|  | Example 4 | Example 5 | Example 6 | Example 7 | Example 8 |
|---|---|---|---|---|---|
| NORDEL IP ® NDR-4640** | 55 | 55 | 55 | 55 | 55 |
| NORDEL IP ® NDR-4520** | 30 | 30 | 30 | 30 | 15 |
| NORDEL IP ® NDR-3722p | — | — | — | — | 30 |
| TRILENE ® 67A Liquid EPDM | 15 | 15 | 15 | 15 | — |
| AGERITE ® Resin D | 2 | 2 | 2 | 2 | 2 |
| WINGTACK ® 95 | 7 | 7 | 7 | 7 | 7 |
| CAB-O-SIL ® TS-530 | — | 70 | — | — | — |
| AEROSIL ® R812S | — | — | 70 | — | — |
| TULLANOX ® 500 | 45 | — | — | 70 | — |
| AEROSIL ® R8200 | — | — | — | — | 70 |
| Stearic Acid | 1 | 1 | 1 | 1 | 1 |
| STRUKTOL ® HPS 11 | — | — | — | — | 2 |
| N-330 Carbon Black | 1 | 1 | 1 | 1 | 1 |
| TZFD88-p Zinc Oxide | 5 | 5 | 5 | 5 | 5 |
| SARET ® 634 zinc dimethacrylate | 10 | 10 | 10 | 10 | 10 |
| DI-CUP ® 40KE | 6 | 10 | 10 | 6 | 4.5 |
| Total | 177 | 206 | 206 | 202 | 202.5 |

**available from DuPont Dow Elastomers of Beaumont, Texas., and contain ethylidene norbornene (ENB) as the diene monomer component.

TABLE 4

|  | Example 4 | Example 5 | Example 6 | Example 7 | Example 8 |
|---|---|---|---|---|---|
| Mooney viscosity (ML 1 + 4 at 100° C.) | 56.0 | 106.4 | 111.4 | 92.3 | 85.9 |

TABLE 4-continued

| | Example 4 | Example 5 | Example 6 | Example 7 | Example 8 |
|---|---|---|---|---|---|
| (ASTM D1646) Mooney scorch time (MS + 1 at 115.6° C.) | | 11.2 | 14.1 | 18.0 | 10.9 |
| (ASTM D1646) Oscillating disk rheometer (160° C., 5° arc) (ASTM D2084) | | | | | |
| Ts2, min | 1.2 | 1.0 | 1.1 | 1.0 | 2.7 |
| ML, in.-lb. | 12.3 | 14.5 | 14.0 | 12.5 | 16.9 |
| MHR or MH (after 2 hrs) (in.-lb) | 96.6 | 173.0 | 198.4 | 118.4 | 107.3 |
| Mc (90) (in-lb.) | 88.2 | 157.2 | 180.0 | 107.8 | 98.3 |
| Tc (90) (min) | 29.0 | 20.8 | 24.5 | 19.5 | 75.0 |
| Specific Gravity(ASTM D792) | 1.0933 | 1.164 | 1.169 | 1.154 | 1.1531 |
| Ash Content (%) | 29.7 | 38.9 | 39.2 | 37.8 | 38.5 |
| Shore A Hardness (ASTM D2240) | 68.2 | 87.8 | 86.8 | 84.4 | 85.1 |
| 100% Modulus (psi) (ASTM D412) | 369 | 918 | 943 | 492 | 519 |
| Tensile Strength (psi) (ASTM D412) | 3100 | 2800 | 2810 | 2780 | 2710 |
| Elongation (%) (ASTM D412) | 649 | 490 | 478 | 750 | 754 |
| Tear Resistance (pli) (ASTM D624) | 346 | 375 | 381 | 470 | 443 |

The Mooney viscosities of the formulations that contained 70 phr of filler were on the high side, but still within the experience base for conventional silica-filled EPDM insulation formulations. All of the inventive formulations exhibited excellent physical properties. The lower stiffness of Example 4, 7, and 8 was attributed to its lower peroxide levels.

TABLE 5

(Comparative Example B)
DL1552A THERMAL INSULATION FORMULATION

| Ingredient | Parts by Weight |
|---|---|
| Buna EP T 3950 (Bayer Corp., Fiber, Additives and Rubber Division of Orange, Texas) | 75 |
| NORDEL ®2722E (DuPont Dow Elastomers) | 20 |
| WINGTACK 95 (hydrocarbon resin) (Goodyear Tire and Rubber Co., Chemical Division of Beaumont, Texas) | 7 |
| IRGANOX 1010 (tetrakis[methylene-3-(3',5'-di-tert-butyl-4'-hydroxyphenyl) proprionate]methane) (Ciba Specialty Chemicals, Additives Division, Tarrytown, N.Y.) | 1 |
| TRYCOL DA-6 (decyl polyoxyethylene alcohol) (Chemical Associates, Inc. of Copley, Ohio) | 0.5 |
| Stearic acid (including palmitic acid) (Harwick Standard Distribution Corp. of Akron, Ohio) | |
| HiSil 233 (silica hydrate) (PPG Industries, Inc. of Lake Charles, Louisiana) | 45 |
| Aluminum oxide C ($Al_2O_3$) (Degussa Corporation of Ridgefield Park, N.J.) | 0.3 |
| N330 carbon black (Columbian Chemicals Co. of Marietta, Ga.) | 1 |
| KALENE 1300 (butyl gum elastomer) (Hardman Division of Harcros Chemicals, Inc. of Belleville, N.J.) | 20 |
| HYPALON 20 (chlorosulfonated polyethylene) (DuPont Dow Elastomers) | 5 |
| AGERITE Resin D (polymerized trimethyl dihydroquinone) (R.T. Vanderbilt Co., Inc. of Buena Park, Ca.) | 0.25 |

TABLE 5-continued (Comparative Example B)
DL1552A THERMAL INSULATION FORMULATION

| Ingredient | Parts by Weight |
|---|---|
| TZFD-88p (zinc oxide dispersed in an EPDM binder) (Rhein Chemie Corp. of Trenton, N.J.) | 2 |
| SP 1056 (bromomethyl alkylated phenolic resin) (Schenectady Int'l, Inc. of Schenectady, N.Y.) | 15 |
| Total Parts by Weight | 193.05 |

Examples 5–7 were subject to comparison testing against Comparative Example B, which represents a conventional thermal insulation formulation known as DL1552A (see Table 5) and containing hydrophilic silica, in a modified high-Mach char motor (see FIG. 3) fired with RSRM TP-H1148 (polybutadieneacrylic acid acrylonitrile (PBAN)-based) propellant. In the char motor test assembly, the propellant was contained in a beaker 30. Low velocity test specimens were located at region 32 upstream of the throat 34, medium velocity insulation test specimens were located in the region 36, and high velocity insulation test specimens were located in region 38. Generally, such a char test motor assembly allows the location of a plurality of different insulation formulation test specimens about the circumference at any of regions 32, 36, and 38, in a conventional manner.

The motor was fired for 11.49 seconds at an average pressure of 947 psi. The moisture insensitive Examples 5–7 exhibited better results, particularly in the high-velocity section of the char motor (average Mach Number from 0.04 to 0.07) compared to Comparative Example B. In the high-velocity region, Examples 5–7 respectively exhibited 25.4, 38.4, and 23.9 percent less ablation than Comparative Example B.

The ablative performance of the hydrophobic silica-filled insulation was also assessed by use of thermal flash testing. The specific thermal flash test was developed to evaluate materials used in the severe ablative environment of the aft dome of a large solid rocket motor. Samples were exposed to high heat flux from calibrated quartz lamps while air was forced over the samples to cause degradation. The thickness of the samples was measured before and after thermal exposure. For the purposes of this experience, the materials were subjected to a heat flux of 40 cal/($cm^2$)(sec) and an exposure time of five seconds in a wind tunnel. Subsonic air flow was available to remove pyrolysis products in order to maintain the desired incident heat flux at the specimen surface. A bank of quartz lamps supplied the heat flux. The total material losses for Examples 5–7 were 32.3 mils, 32.0 mils, and 31.8 mils, respectively, compared to 55.5 mils for Comparative Example B. FIG. 4 shows a comparison of thermal flash test results for Example 2 (triangles) and Example 3 (squares) compared to Comparative Example B (diamonds). The moisture insensitive insulation of this invention had losses that were 42 to 44 percent lower, and hence significantly better, than the standard conventional insulation.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. A rocket motor assembly comprising:
   a case having a combustion chamber;
   a nozzle in operative relationship with the case;
   at least one solid propellant loaded in the combustion chamber of the case; and
   an elastomeric rocket motor insulation interposed between the case and the at least one solid propellant, the elastomeric rocket motor insulation comprising:
      at least one ethylene-propylene-diene monomer (EPDM) rubber, the EPDM rubber being formed from an EPDM polymer cured with at least one peroxide curative and at least one curative coagent, the at least one curative coagent comprising a polyfunctional metal salt for forming organometallic cross-link bonds in the EPDM rubber; and
      filler comprising at least one member selected from the group consisting of silica particles and silicate particles, the filler being treated with at least one hydrophobic surface agent.

2. The rocket motor assembly of claim 1, wherein the at least one curative coagent comprises at least one member selected from the group consisting of metal salts, zinc diacrylte and zinc dimethacrylate.

3. The rocket motor assembly of claim 2, wherein the at least one curative coagent is present in an effective amount to impart upon the elastomer rocket motor insulation, subsequent to cure, a 100% modulus of at least 400 psi and a tear resistance of at least 300 pli.

4. The rocket motor assembly of claim 2, wherein the EPDM rubber constitutes 50 weight % to 70 weight % of the elastomeric rocket motor insulation.

5. A rocket motor assembly comprising:
   a case having a combustion chamber;
   a nozzle in operative relationship with the case;
   at least one solid propellant loaded in the combustion chamber of the case; and
   an elastomeric rocket motor insulation interposed between the case and the at least one solid propellant, the elastomeric rocket motor insulation comprising:
      at least one elastomer, the at least one elastomer being formed from at least one organic polymer cured with at least one peroxide curative and at least one curative coagent, the at least one curative coagent comprising a polyfunctional metal salt for forming organometallic cross-link bonds; and
      filler comprising at least one member selected from the group consisting of silica particles and silicate particles, the filler being treated with at least one hydrophobic surface agent.

6. The rocket motor assembly of claim 5, wherein the at least one elastomer comprises at least one member selected from the group consisting of ethylene-propylene-diene monomer (EPDM) rubber, natural rubber, butyl rubber, butadiene-styrene copolymer rubbers, nitrile rubbers, neoprene rubbers, polybutadiene rubbers, and polyisoprene rubbers.

7. The rocket motor assembly of claim 5, wherein the at least one elastomer comprises ethylene-propylene-diene monomer (EPDM) rubber.

8. The rocket motor assembly of claim 5, wherein the at least one curative coagent comprises at least one member selected from the group consisting of metal salts, zinc diacrylate and zinc dimethacrylate.

9. The rocket motor assembly of claim 8, wherein the at least one curative coagent is present in an effective amount to impart upon the elastomeric rocket motor insulation, subsequent to cure, a 100% modulus of at least 400 psi and a tear resistance of at least 300 pli.

10. The rocket motor assembly of claim 8, wherein the at least one elastomer constitutes 35 weight % to 80 weight % of the elastomeric rocket motor insulation.

11. A method for making a rocket motor assembly, comprising:
    cross-linking at least one ethylene-propylene-diene monomer (EPDM) rubber with at least one peroxide curative and at least one curative coagent in the presence of a filler to form an elastomeric rocket motor insulation, the at least one curative coagent comprising a polyfunctional metal salt for forming organometallic cross-link bonds in the at least one EPDM rubber, the filler comprising at least one member selected from the group consisting of silica particles and silicate particles, the filler being treated with at least one hydrophobic surface agent; and
    preparing a rocket motor assembly containing the elastomeric rocket motor insulation, the rocket motor assembly comprising a case having a combustion chamber, a nozzle in operative relationship with the case, at least one solid propellant loaded in the combustion chamber of the case, and the elastomeric rocket motor insulation interposed between the case and the at least one solid propellant.

12. The method of claim 11, wherein the at least one curative coagent comprises at least one member selected from the group consisting of metal salts, zinc diacrylate and zinc dimethacrylate.

13. The method of claim 11, wherein the at least one curative coagent is present in an effective amount to impart upon the elastomer rocket motor insulation, subsequent to cure, a 100% modulus of at least 400 psi and a tear resistance of at least 300 pli.

14. The method of claim 11, wherein the at least one EPDM rubber constitutes 50 weight % to 70 weight % of the elastomeric rocket motor insulation.

15. A method for making a rocket motor assembly, comprising:
    cross-linking at least one organic polymer with at least one peroxide curative and at least one curative coagent in the presence of a filler to form an elastomeric rocket motor insulation, the at least one curative coagent comprising a polyfunctional metal salt for forming organometallic cross-link bonds, the filler comprising at least one member selected from the group consisting of silica particles and silicate particles, the filler being treated with at least one hydrophobic surface agent; and
    preparing a rocket motor assembly containing the elastomeric rocket motor insulation, the rocket motor assembly comprising a case having a combustion chamber, a nozzle in operative relationship with the case, at least one solid propellant loaded in the combustion chamber of the case, and the elastomeric rocket motor insulation interposed between the case and the at least one solid propellant.

16. The method of claim 15, wherein the at least one organic polymer comprises at least one member selected from the group consisting of ethylene-propylene-diene monomer (EPDM) rubber, natural rubber, butyl rubber, butadiene-styrene copolymer rubbers, nitrile rubbers, neoprene rubbers, polybutadiene rubbers, and polyisoprene rubbers.

17. The method of claim 15, wherein the at least one organic polymer comprises ethylene-propylene-diene monomer (EPDM) rubber.

18. The method of claim 15, wherein the at least one curative coagent comprises at least one member selected from consisting of metal salts, zinc diacrylate and zinc dimethaclylate.

19. The method of claim 18, wherein the at least one curative coagent is present in an effective amount to impart upon the elastomeric rocket motor insulation, subsequent to curing, a 100% modulus of at least 400 psi and a tear resistance of at least 300 pli.

20. The method of claim 18, wherein the at least one organic polymer constitutes 35 weight % to 80 weight % of the elastomeric rocket motor insulation.

* * * * *